Aug. 11, 1925.

C. WALES 1,549,101

MOTOR DRIVEN CALCULATING MACHINE

Filed April 20, 1920    7 Sheets-Sheet 2

Inventor
Charles Wales
By his Attorneys

Aug. 11, 1925.

C. WALES 1,549,101

MOTOR DRIVEN CALCULATING MACHINE

Filed April 20, 1920     7 Sheets-Sheet 3

Inventor
Charles Wales
By his Attorneys

Aug. 11, 1925. 1,549,101
C. WALES
MOTOR DRIVEN CALCULATING MACHINE
Filed April 20, 1920 7 Sheets-Sheet 4

Inventor
Charles Wales.
By his Attorneys

Aug. 11, 1925.

C. WALES 1,549,101

MOTOR DRIVEN CALCULATING MACHINE

Filed April 20, 1920  7 Sheets-Sheet 5

Inventor
Charles Wales
By his Attorneys
Bartlett & Brownell

Aug. 11, 1925. 1,549,101
C. WALES
MOTOR DRIVEN CALCULATING MACHINE
Filed April 20, 1920  7 Sheets-Sheet 6

Inventor
Charles Wales
By his Attorneys

Patented Aug. 11, 1925.

1,549,101

UNITED STATES PATENT OFFICE.

CHARLES WALES, OF NEW YORK, N. Y., ASSIGNOR, BY MESNE ASSIGNMENTS, TO FEDEARAL ADDING MACHINES INCORPORATED, OF NEW YORK, N. Y., A CORPORATION OF NEW YORK.

MOTOR-DRIVEN CALCULATING MACHINE.

Application filed April 20, 1920. Serial No. 375,352.

*To all whom it may concern:*

Be it known that I, CHARLES WALES, a citizen of the United States, residing at city, county, and State of New York, have invented a certain new and useful Improvement in Motor-Driven Calculating Machines, of which the following is a full, clear, and exact description.

My invention relates to motor driven calculating machines. One object of this invention is to make a self-contained motor driven adding machine which is easily portable, which is not the case with prior machines equipped with a motor either under or outside of the adding machine case. For the purpose of gaining portability I have, as a feature of my invention, installed the motor within the case of the adding machine immediately beneath the keyboard.

Another object of my invention is to take advantage of the fact that the calculating mechanism of an adding machine is exceedingly easy to operate when detached from the motive or handle section of such machines. I therefore, as another feature of my invention, operate the mechanism positively at all times by the motor direct, instead of through the ordinary spring controlled shaft. This will greatly reduce the size of the motor and the consumption of current.

Another object of this invention is to operate the calculating section of the adding machine with an irregularly shaped cam, thus avoiding the inflexible motion of a crank-operated device. This irregular cam, constituting another feature of my invention, permits of correct timing of the action of the calculating machine, and also enables the load on the motor to be eased up at heavy points so as to make its load substantially uniform.

Another object of this invention is to greatly lessen the parts required to build an electrically operated adding machine by omitting certain parts necessary for hand operation or spring controlled motor operation. The omission of these parts constitutes another feature of my invention.

Another object of the invention is to so control the motor of the adding machine that if the operator ceases to operate the machine from the key-board for a given length of time, preferably one or two minutes, the machine will automatically open the electric switch and stop the motor. This automatic switch opening mechanism constitutes another feature of my invention.

Another purpose of this invention is to provide for the attachment of a crank to the drive shaft of the motor drive mechanism, so that the machine may be manually operated for the purpose of adjustment or assembly or repair. The means for actuating the motor drive shaft by hand constitutes another feature.

Another object of this invention is to place the entire motor mechanism over a pan-shaped base plate of the machine so that it will be impossible for oil to escape to the floor or be thrown upon the garments of the operator. This constitutes another feature.

Another object of this invention is to so unite the calculating mechanism of the adding machine with the positive cam which operates it that the frame of the machine can be tipped forward as explained in a previous United States Patent No. 1,232,739, granted to me July 10, 1917, thus enabling the repairman to get at and oil all parts of the machine. This uniting of the calculating mechanism with the operating cam constitutes another feature.

Another object of this invention is to place the motor drive in the base of the machine as a separate structure with an independent sub-base having longitudinal adjustment so that its relation to the calculating mechanism and the side frames of the machine may be varied as required. The use of this sub-base, attachable to the main base, constitutes another feature.

Another object of this invention is to so assemble the frame of the electric motor on the frame of the motor drive in such manner that quick change can be made from alternating to direct motors, or vice versa, or from an old motor to a new motor. The means for exchanging motors of different types constitutes another feature.

Another object of this invention is to provide a touch bar which is located upon the key-board proper of the machine and not requiring gashes or gaps in the case and so arranged that it may be tipped into a perpendicular position, at the same time displaying a sign upon the bottom of it saying "Hands off", the purpose of this being to show, during a temporary absence of the operator, that the machine is in use and must not be operated. This device also enables the placing of the case without the removal of the touch-bar. This tipping touch bar constitutes another feature of my invention.

With these objects in view, the following is a description of the parts of the machine and their relation to each other, reference being made at times to my United States Patent No. 1,232,739, which discloses certain features contained in the machine in which I have incorporated this invention, and to the accompanying drawings, in which.

Fig. 2ª is a detail;

Fig. 3 is a detailed view showing the drive cam and clutch for connecting it to the drive shaft and co-acting parts;

Fig. 3ª is a detail of the pawl forming a part of the clutch;

Fig. 5 (Sheet 2) shows an end view of the drive shaft and its relation to the motor and main base of the machine;

Figure 1:
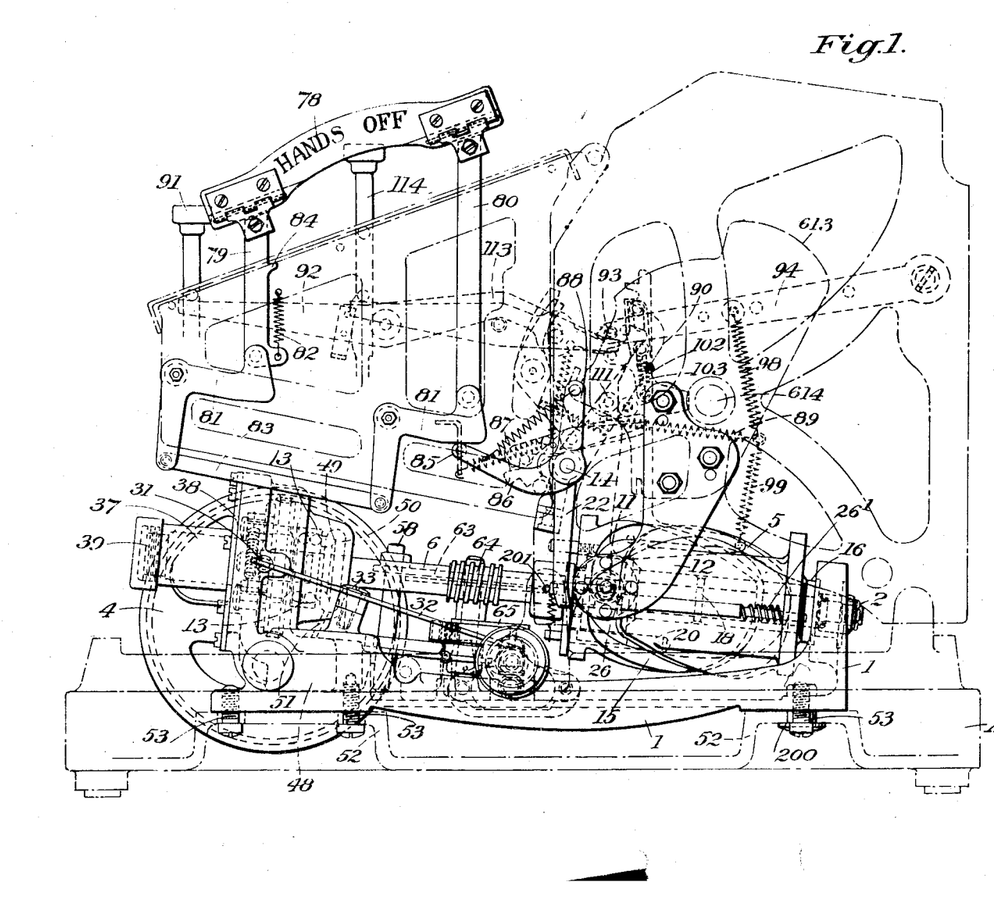
Fig. 1 is a side elevation of a calculating machine embodying my invention, parts located at the right-hand of the machine being shown in full lines and parts remote therefrom being shown in dotted lines.
Figure 2:
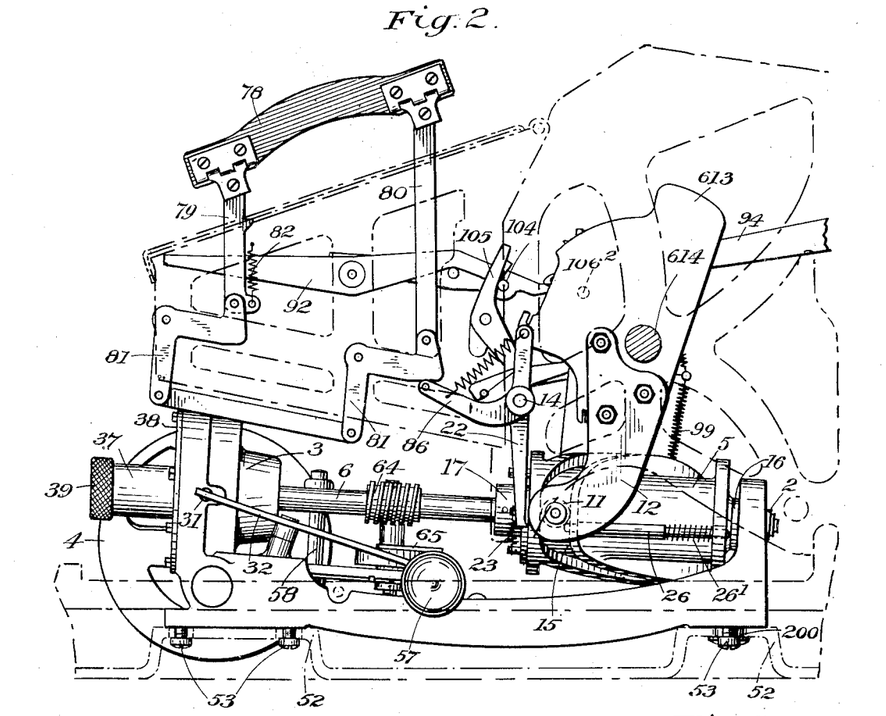
Fig. 2 is a similar side elevation showing only the parts located at the right-hand side of the machine.
Figure 7:
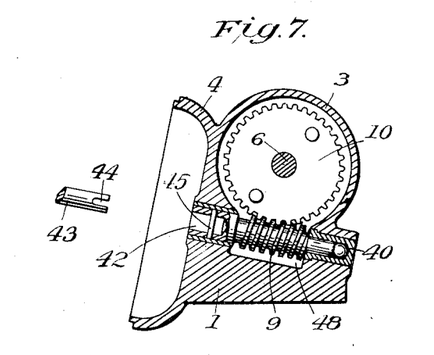
Fig. 7 is a sectional detail showing the worm connection between the motor and the gear carrying the lever cams of Fig. 6.

Referring more particularly to the drawings in general, the motor drive is made up as follows: Mounted on the base A of the machine, shown in dots in Fig. 1, is a sub-base 1, which contains the rear bearing 2 for the cam shaft, worm gear housing 3 and motor housing 4 in one casting. The drive consists of a cylindrical operating cam 5, mounted loosely on a cam shaft 6 and operated by a clutch wheel 7 (Figs. 3, 4 and 13), driven by a motor 8 (Figure 5) through a worm 9 and a worm-gear 10 (Fig. 7). The cam 5 operates a roller 11 (Figs. 2, 13 and 14), which is mounted on an extension 12 bolted to the main operating cam of the hand-driven machine known as the 613 cam, (cam 95 of Patent No. 1,232,739), mounted on the main cam shaft 614 of the calculating mechanism. The roller 11 and the rear end of the cam shaft 6 are carried on suitable ball bearings so constructed as to take thrust in both directions and the other end of the cam shaft is mounted on a self alining ball bearing 13 of standard make. The drive is provided with automatic means of operating cut-out and permanent stops which will be described in detail later.

To install a motor drive in a hand machine, the crank shaft and all operating shafts, levers, links and springs leading from the usual crank shaft (shaft 68 of Patent No. 1,232,739) to the 613 cam are removed. The extension 12 (Figs. 1 and 14) is mounted on the 613 cam; the operating shaft 14 with its hereafter described arms and levers is mounted in the side members of the machine and a new main base A is substituted for the old base. The sub-base 1 containing the motor drive is then placed on and suitably secured to the main base of the machine so that the roller 11 on the extension 12 lies in the groove 15 of the cam 5, and the machine is immediately ready for operation.

The operating cam 5 is provided with a groove 15 (Fig. 13) for the roller 11, which groove is so designed that the pressure on the roller 11 is the same at all times so as to make the load on the motor uniform and the 613 cam is operated in such a manner that all parts of the adding machine function properly.

Figure 15:
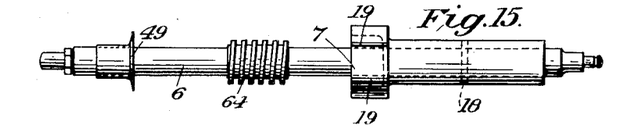
Fig. 15 shows a detail of part of the clutch mechanism upon the drive shaft.

The operating cam 5 is located on the cam shaft 6, between the thrust washer 16, which separates it from the rear bearing, and the hub 17, which limits motion in the other direction. Mounted on and pinned at 18 to the cam shaft 6 and carrying the cam 5 is the clutch wheel 7 (Figs. 3, 4 and 15), which is a cylindrical piece having a head of increased diameter with a number of teeth 19, preferably six, to engage a clutch dog 20, which is mounted in and carried by drive cam 5.

Figures 3, 3A:
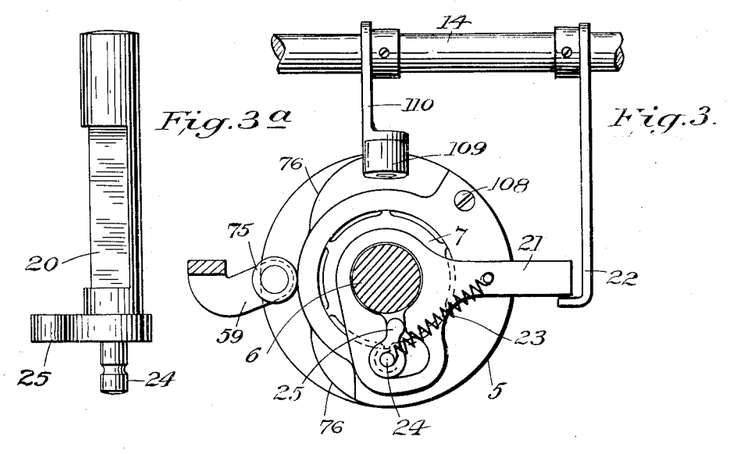

The clutch dog 20, see Fig. 3ª, is operated by spring tension through a clutch operating arm 21 (Fig. 3), which between cycles is held in a neutral position by a lever catch 22, mounted on the operating shaft 14 (Figs. 1, 2 and 3), and operated automatically in a manner to be described later. A spring 23 is stretched between the arm 21 and a post 24 in the end of the dog 20, and by the rotation of the shaft 14 the end of the lever catch 22 is removed from under the arm 21, which is slotted to receive an extension 25 of the dog 20 in the shape of a ball lever (Fig. 3). As the arm 21 is released the tension of the spring 23 rotates it about the cam shaft 6 causing the dog 20 to turn so that the nose of the dog engages with one of the teeth 19 on the clutch 7, locking the cam 5 to the operating shaft 6 and causing the cam to revolve. The shape of the nose on the dog and the teeth 19 of the clutch is such that added pressure causes them to swing into closer engagement. As soon as the lever 21 returns to its normal position it engages the arm 22 and releases the pawl.

Figure 4:
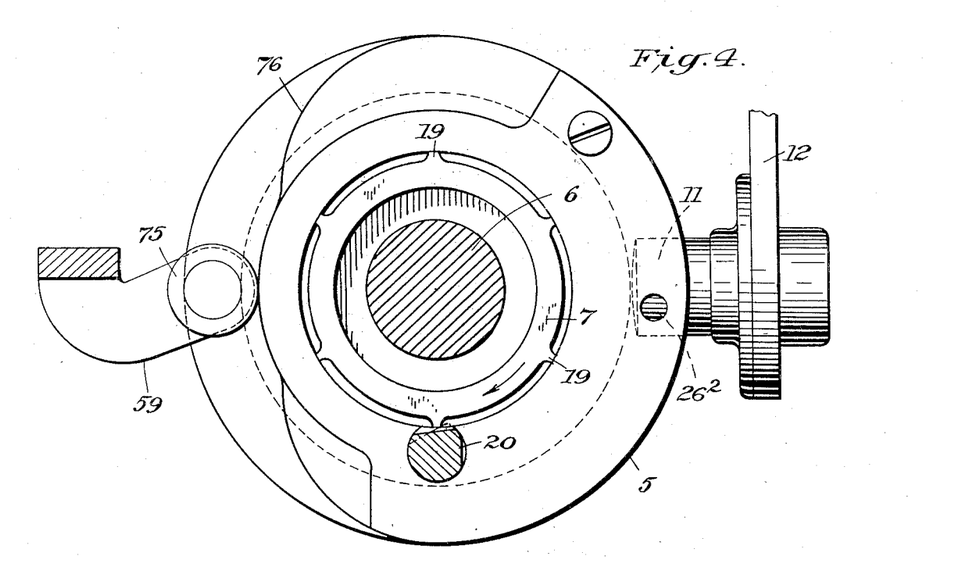
Fig. 4 is an enlarged view of the cam and clutch showing the pawl in section.
Figure 6:
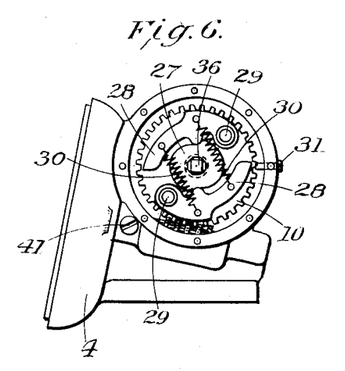
Fig. 6 is a detail view showing the cam connection between the motor and the drive shaft.
Figures 8, 9, 10, 11, 12:
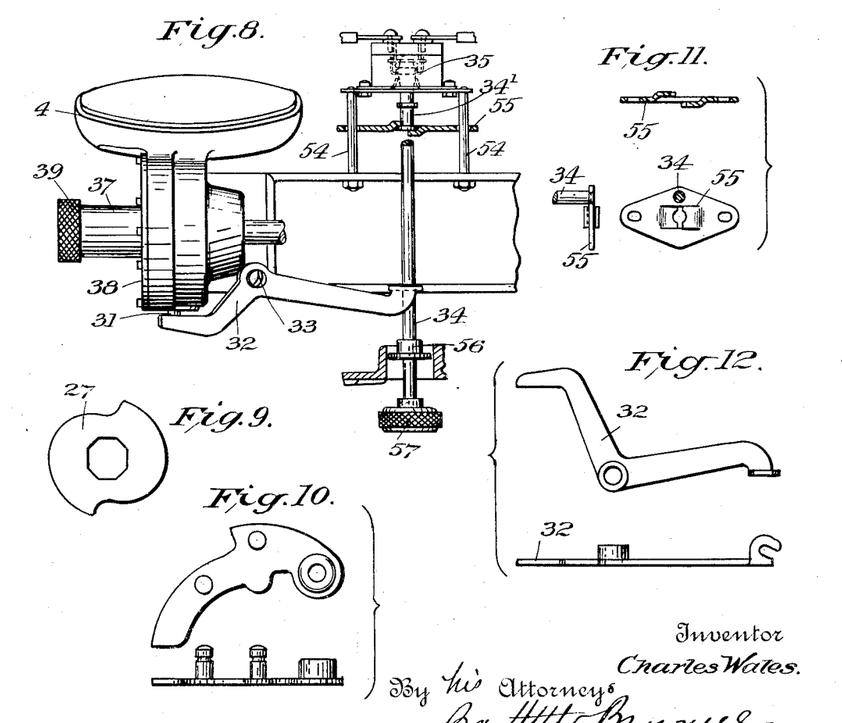
Fig. 8 is a plan view of certain details showing the means for opening the motor switch when the calculating mechanism becomes stalled.
Fig. 9 is a detail of the cam of Fig. 6.
Fig. 10 shows in plan and side elevation the cam levers of Fig. 6.
Fig. 11 shows in section and in side and end elevation the sliding plate between the switch and its operating handle.
Fig. 12 is a detail view showing in plan and side elevation the lever for opening the switch when the calculating mechanism becomes stalled.

A spring pin 26 (Figs. 1, 13 and 14) mounted in the operating cam 5, engages the under side of the cam roller 11 between cycles, preventing chattering of the cam or any tendency towards a reversed motion and holding the drive in a neutral position, the pin 26 being held against the roller 11 by the action of the spring 26'. The pin 26 is inserted through the hole 26² (Fig. 4). The drive-shaft 6 is continually revolving clockwise (Fig. 4), while the current is turned on, being driven at a reduction from the motor speed by the worm 9 and the gear 10. The connection between the gear and shaft (see Fig. 6), is formed by a cam 27 integral with the shaft 6 and two lever cams 28, pivoted at 29—29 on the gear 10 and held in place against the cam 27 by springs 30. The cam 27 and thus the cam shaft 6 are driven by engagement with the lever cams 28 and if, on account of some abnormal condition such as blocking, the power required to operate the machine becomes too great for the springs 30 to carry, the lever cams 28 will climb up on rises of the cam 27 and with the gear 10 will revolve without driving the machine. The lever cams 28 are so shaped that in their outward position they will operate against the inner end of a pin 31 (Figs. 1, 6 and 8), causing it to move outward and operate a lever 32, which is mounted at 33 on the sub-base 1 (Fig. 8) and connected with an actuating bar 34 of an electric motor-controlling switch 35. Movement of this lever 32 opens the switch 35, stops the motor, and prevents any damage to the adding machine or motor.

The end of the cam shaft 6 is squared off at 36 (Fig. 6) beyond the cam 27 to enable the assembler or repairman to operate the machine by hand for examination or inspection by inserting a crank through a sleeve 37 on the cover 38 of the gear chamber, upon removing the cap 39 (Fig. 1).

The worm 9 runs in the casing in bronze bushings. The lower bushing is drilled to take the trunnion on the worm and so arranged that the thrust is taken by a single ball 40 in the bottom of a socket (Fig. 7). A bushing for the upper bearing of the worm is held in place by a screw 41 and the trunnion of the worm is reamed out at 42 to take the end of the shaft 43 of the motor, which is slotted at 44 to slip over a pin 45, which is riveted into the trunnion of the worm 9. This makes a very compact separable telescopic shaft joint as well as a universal connection, making exact alinement of the motor unnecessary.

Figures 2A, 5:
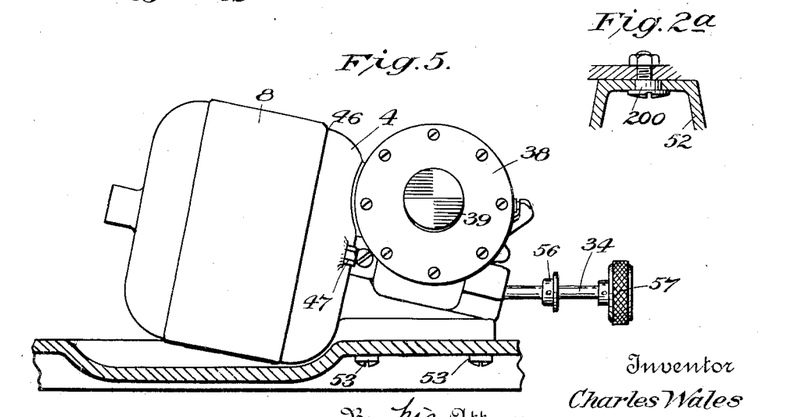

The motor, A. C. or D. C., as required, is of standard make and furnished without the front end bearing. Its face is machined to fit the face of the motor housing 4, on the sub-base 1, at the joint 46 and held by suitable means such as bolts 47 (Fig. 5). Therefore, in a case of change of current or for any other reason, the motor can be changed in a very few moments by simply unlocking the motor frame and withdrawing the shaft of the motor and substituting a new one or one adapted for the current.

The lower part of the sub-base 1 about the worm contains a chamber 48 (Figs. 1 and 7) so placed that the worm will run in a bath of oil about on the level with the center line. To prevent the oil from being carried up on the worm gear, the worm and motor shaft are inclined, as shown in Fig. 7, and to prevent its working out of the rear end of the housing 3, there is provided a deflector 49, pinned to the cam shaft, which throws the oil off into a grooved chamber 50 from whence it flows through drilled holes 51 back into the oil chamber (Fig. 1). The lower bearing of the worm 9 is a drive fit into the housing and the angle at which the worm is set substantially prevents any oil working out through its upper bearing.

As the sub-base 1 is set well down in the base of the machine and the base A itself is a single casting with no holes through its bottom, from which the sub-base 1 is spaced away by hollow risers 52, there is no danger of any oil which may work out of the drive being able to work out of the machine during operation.

The sub-base 1 is secured to the base of the machine by four screws 53 in the forward end and by two screws 53 in the rear end, whose heads are within the risers 52. On account of the inequalities that creep into manufacture, the holes in the risers are elongated so that an adjustment of one-sixteenth of an inch each way is provided. This makes it possible to correctly adjust the cam 5 relatively to the roller 11. To assist in the adjustment an eccentric 200 is provided.

The groove 15 in the operating cam 5 is of such shape that the roller 11 stands in a vertical dwell of the cam when it is at the end of a cycle. This dwell permits the carrying devices of the calculating machine to fully function before a new cycle is begun and also allows the body of the machine to be tipped up for inspection about the pivot 201, as provided for in Patent No. 1,232,739, dated July 10, 1917.

The electric switch 35 (see Figs. 8 and 13) is of standard make, opening when the stem is pressed. It is mounted on the inner side of the sub-base by two posts 54 and loosely sliding on these posts is the plate 55, which is slotted in its center to take the head of the stem 34' of the switch in a flexible connection that will allow for adjusting the sub-base. Riveted into the plate 55 at a point above the center is the switch bar 34, the outer end of which is provided with a flanged bushing or hub 56 which slides into a hole similar to the hole provided in the base of a hand-operated machine for the handle and provides a fixed bearing for the bar 34. The plate 55 has slotted bearings for the posts 54 so that it can be firmly fixed to the bar 34, which moves in the fixed bearing.

The switch bar 34 is operated by hand to close or open the switch by the knob 57 mounted on its outer end.

Figures 16, 17, 18, 19, 20:
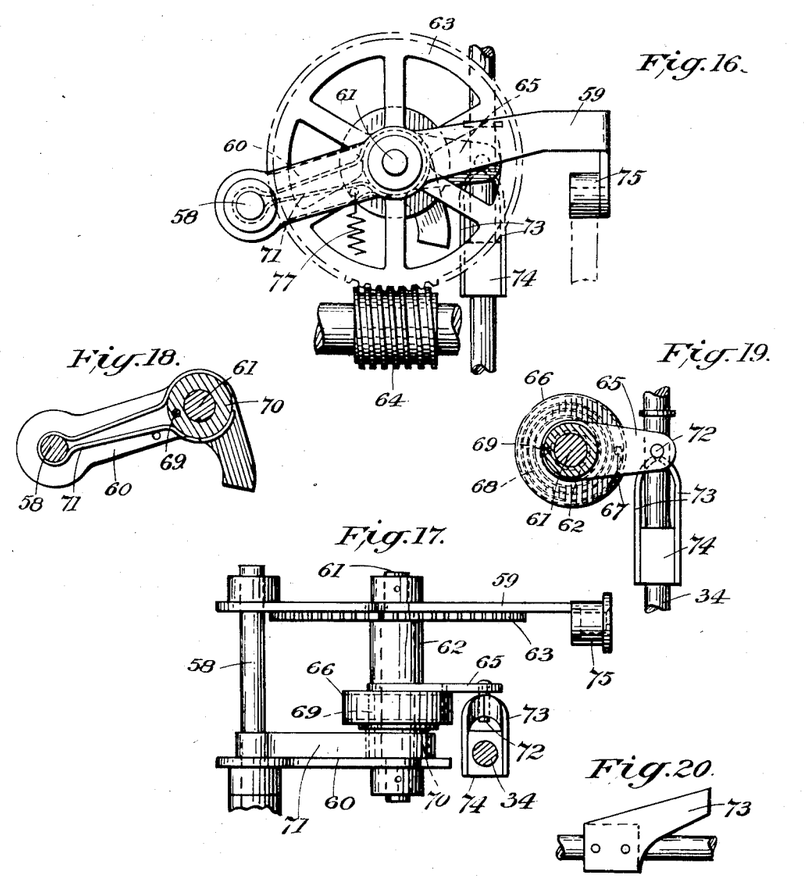
Fig. 16 shows in plan view details of means for opening the motor circuit when the machine is not used for a predetermined period.
Fig. 17 is a side elevation of the same.
Fig. 18 is a plan view showing details of a frictional drag in connection with the mechanism of Figs. 16 and 17.
Fig. 19 is a plan view of other details forming part of the mechanism shown in Figs. 16 and 17.
Fig. 20 is a detail of certain springs shown in Figs. 16 and 17.

*Mechanical automatic time stop.*—In order to stop the motor, if left running and unattended for a considerable time, I provide a stop mechanism as follows: Mounted upon the inside of the sub-base near the front end is a post 58 (Figs. 1, 13, 16 and 17); swinging from the top of this post is an arm 59, and near the bottom an arm 60, and into the outer hubs of these two arms is pinned a vertical shaft 61. On a sleeve 62 on this shaft at a level with the center line of the cam shaft 6 is a gear 63, which is driven by a worm 64 (Figs. 16 and 17), pinned to the cam shaft. On the sleeve 62 below the gear 63 is a lever 65 and a spring case 66. Riveted to the latter is a spring post 67, which carries the outer end of a flat spiral clock spring 68 (Fig. 19).

Figure 13:
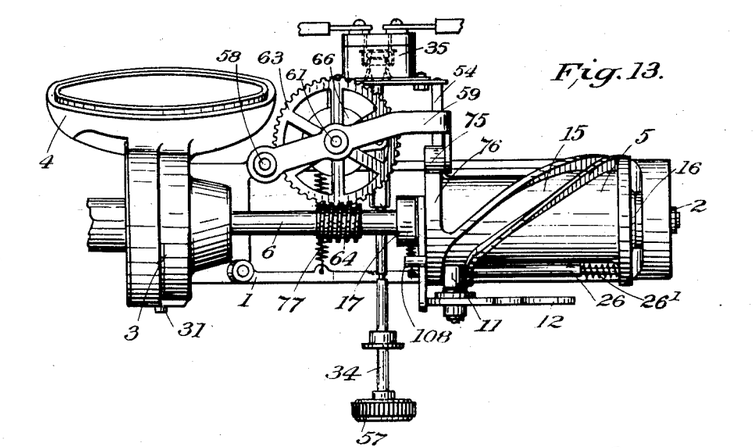
Fig. 13 is a plan view of the motor drive with its independent base disassociated from the calculating mechanism other than the operating lever.
Figure 14:
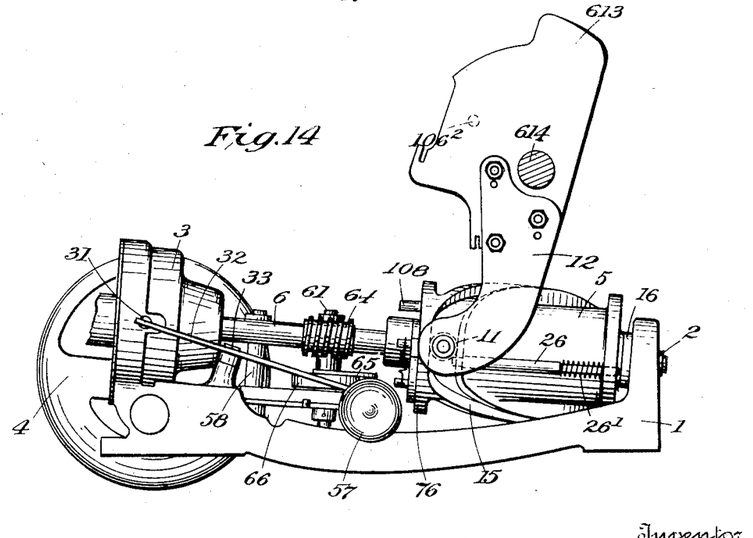
Fig. 14 is a side elevation of the same.

The inside end of the spring is carried on a pin 69 in a friction disc 70 which is loosely mounted on the shaft 61 and controlled by a friction spring 71, using the post 58 as an anchor. On the end of the lever 65 is a pin 72, which engages with springs 73, riveted on a block 74 secured to the switch bar 34. The outer end of the lever 59 is flanged down and carries a roller 75 which runs on a cam 76 on the periphery of the forward flange of the operating cam 5 (Figs. 13, 16 and 17). The gear 63 is held in mesh with the worm 64 by a tension spring 77, stretched between the lever 60 and the outer edge of the sub-base.

The above mechanism constitutes the automatic time stop and the operation is as follows:

The gear 63 and lever 65 are in fixed relation with each other on sleeve 62. With the machine at rest and the motor stopped the pin 72 rests against the point of the springs 73 (Figs. 16 and 19), held there by the action of the clock spring 68. As the cam shaft revolves the worm 64 turns the gear 63 and lever 65 anti-clockwise winding the spring 68 to a greater tension. As this tension builds up it eventually overcomes the friction between the disc 70 and the spring 71 and carries the disc around with it. During operation the cam 76 on the periphery of the front flange of the operating cam 5, acting through the roller 75, forces the arms 59 and 60 outward against the action of the spring 77, disengaging the gear 63 from the worm 64 with each revolution of the operating cam 5. This allows the spring 68 to return the lever 65 to its normal position with the pin 72 resting against the springs 73 mounted on the switch bar 34 (Fig. 16). In case the machine is not operated the gear 63 and the lever 65 will revolve about one full revolution until the pin 72 engages the inside surface of the springs 73 and pulls the switch bar inward, opening the switch 35 and stopping the motor. The momentum of the motor is such that it will carry the pin 72 through the springs 73 into its normal position (Fig. 19). The time required for this operation is about one minute and ten seconds.

Figure 21:
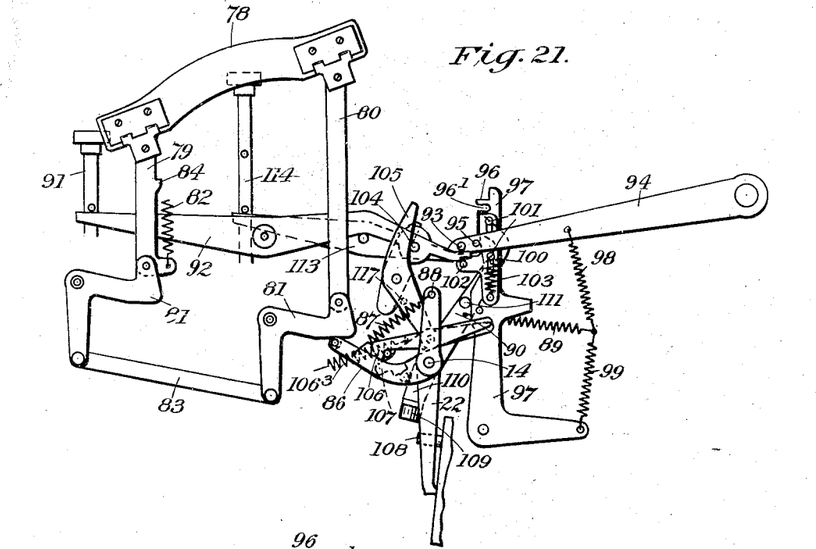
Fig. 21 is a side elevation of the touch bar together with the control shaft and the total and sub-total keys and interconnecting mechanism.

*Keyboard connections.*—The touch bar 78 (shown turned up in Figs. 1, 2 and 21) is hinged to the stems 79 and 80, which are mounted on bell-crank levers 81 and are held up by the action of a spring 82. An equalizing bar 83 (Fig. 21) between the bell-crank levers insures parallel motion. The stem 79, by a projection 84, is stopped against the keyboard plate for an upper limit. When the touch bar is depressed the rear bell-crank 81 cams against a roller 85 on a lever 86 mounted loosely on the operating shaft 14, and connected by a spring 87 to a lever 88, which is pinned to the shaft 14. The action of the touch bar depresses the lever 86, and through the action of the spring 87 the operating shaft 14 is rotated and the lever 22 is swung from under the clutch arm 21. When the touch bar is released the lever 22 is returned to its normal position through the action of spring 89, operating on the lever 90 pinned to the opposite end of the shaft 14, whereupon it reengages the arm 21 and releases the clutch.

Depressing the total key 91 (Figs. 1 and 21) operates the total lever 92 against a pin 93 on the end of the total operating lever 94, which is the same as used in the hand-operated machine. The total operating lever 94 rises until the pin 95 engages the upper notch 96 of the lock lever 97, and the totalizing mechanism is operated exactly the same as in the hand machine, as described in Patent No. 1,232,739. Return action of the total lever 94 is provided by the spring 98. The lock lever 97 is controlled by the spring 99. To prevent the pin 95 from dropping into the lower notch 96' of the lock lever 97, there is provided a slide 100, mounted on pins 101 on the lock lever 97 and carrying a pin 102, which is held against the bottom of the total lever 92 by the spring 103. When the total lever is operated the pin 102 allows the slide 100 to rise and cover the lower notch 96' on the lock lever 97. As the total lever 92 is operated the roller 104 mounted on it cams against the lever 105, the lower end of which carries the pivoted latch 106 and the lock 107. During operation the bar 106' mounted on arms on the shaft 107', as in Patent No. 1,232,739, is swung rearward by the latch 106, advancing the initial stops (not shown), which control the printing and carrying mechanism, as described in said patent. The lock 107 falls and holds the mechanism in place by its engagement with the shaft 107', insuring the operation of the totalizing mechanism in case the operator releases the total key. A pin 106² carried by the 613 cam and operating against the outer end of lever 106 releases that lever, as described in my said patent, and also releases 107, whereupon a spring 106³ returns them to their normal position.

This locking mechanism and manner of bringing forward the initial stops is the same as used in the hand machine of my patent.

As the operating cam 5 revolves a stud 108 on its front face (Figs. 3, 14 and 21), operating against a roller 109 on a lever 110, rotates the shaft 14 so that the roller 111 on the lever 90, which is pinned to the shaft 14, operating against the edge of the lock lever 97, forces the latter back so that the pin 95 (Fig. 21) is released and the total operating lever 94 is returned to normal position by the spring 98 carrying the operating parts back with it.

Figure 22:
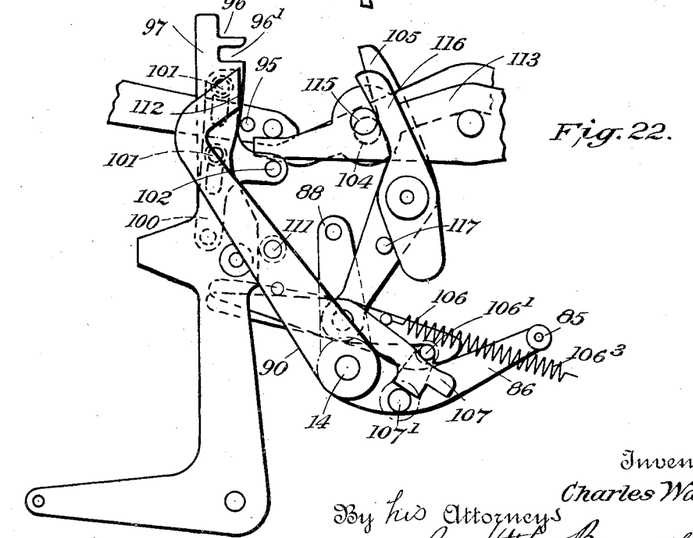
Fig. 22 is an enlarged reversed view of certain portions of Fig. 21.

The lever 90 (Figs. 21 and 22) has a face 112 on its upper end which opposes the pin 95 and prevents the operation of the shaft 14 by the touch bar while the total or subtotal keys are partially moved, also when the shaft 14 is operated by the touch bar the hook in the upper part of the lever 90 swings over the pin 95 and prevents the operating of the totalizing or sub-totalizing mechanism. In taking a sub-total the operation is practically the same as taking a total, with the exception that the sub-total lever 113 (Fig. 21), being depressed by the sub-total key 114, operates the roller 115 mounted on it against the lever 116, which cams against the pin 117 on the lever 105 of the totalizing mechanism. The balance of the mechanism is the same as that used for taking a total, excepting that, the pin 102 on the slide 100 being held down by the total lever 92, the pin 95 on total operating arm 94 is embraced by the lower notch 96' of lock lever 97 and a sub-total is taken as in the hand-operated machine.

With the construction above described, operating as stated, the objects of my invention are attained.

As will be evident to those skilled in the art, my invention permits of various modifications without departing from the spirit thereof or the scope of the appended claims.

What I claim is:

1. In a calculating machine, the combination of a calculating mechanism having a main shaft, a cam having a cam groove, a motor normally running continuously, manually actuated means for connecting said motor and cam, automatic means for disconnecting said motor and cam when said cam has made a complete revolution, and means connected to said shaft and engaging said cam groove for causing said shaft to make a complete oscillation during each revolution of said cam, the axis of said cam being at right angles of said shaft and said groove being so shaped as to make the load upon said motor during the actuating movement of said cam substantially constant.

2. In a calculating machine, the combination of a calculating mechanism having a main shaft, a cam having a cam groove, a motor normally running continuously, manually actuated means for connecting said motor and cam, automatic means for disconnecting said motor and cam when said cam has made a complete revolution, and means connected to said shaft and engaging said cam groove for causing said shaft to make a complete oscillation during each revolution of said cam, said cam groove having a dwell engaged by said means for a period ending after its movement begins.

3. In a calculating machine, the combination of a calculating mechanism having a main shaft, a cam having a cam groove, a motor normally running continuously, manually actuated means for connecting said motor and cam, automatic means for disconnecting said motor and cam when said cam has made a complete revolution, and means connected to said shaft and engaging said cam groove for causing said shaft to make a complete oscillation during each revolution of said cam, the axis of said cam being at right angles of said shaft and said groove acting so as to make the load upon said motor during the actuating movement of said cam substantially constant said cam groove having a dwell engaged by said means for a period beginning before said cam stops.

4. In a calculating machine, the combination of a calculating mechanism having a main shaft, a cam having a cam groove, means connected to said shaft and engaging said cam groove, a motor normally running continuously, a drive shaft connected to said motor and on which said cam is rotatedly mounted, a ratchet wheel on said drive shaft, a pawl carried by said cam, and normally tending to engage said ratchet wheel, automatic means for retracting said pawl from said ratchet wheel when said cam has completed one revolution, and manual means for releasing said pawl so as to permit it to engage said ratchet wheel.

5. In a calculating machine, the combination of a calculating mechanism having a main shaft, a continuously running motor, means connecting said motor and shaft so that said motor actuates said shaft, means for automatically disconnecting said motor at the end of a cycle of said mechanism, a worm driven by said motor and continuously rotating therewith, a gear driven by said worm, an actuator connected to said gear, a spring tending to restore said actuator to initial position, a brake on the shaft of said gear, a movable frame carrying said gear and tending to hold it in engagement with said worm, and a cam acting on said frame during each cycle of the calculating mechanism and moving it so as to disengage said gear from said worm.

6. In a calculating machine, the combination of a calculating mechanism having a main shaft, a base supporting said mechanism, a keyboard supported by said mechanism and spaced away from said base, a motor located between said base and keyboard, a rearwardly extending driving shaft actuated by said motor, means on the rear end of said driving shaft for actuating the main shaft of said mechanism, a cover supported by said base and enclosing said mechanism, keyboard and motor, a sub-base carrying said motor and driving shaft and supported by said main base and removable therefrom.

7. In a calculating machine, the combination of a calculating mechanism having a main shaft, a base supporting said mechanism, a keyboard supported by said mechanism and spaced away from said base, a motor located between said base and keyboard, a rearwardly extending driving shaft actuated by said motor, means on the rear end of said driving shaft for actuating the main shaft of said mechanism, a cover supported by said base and enclosing said mechanism, keyboard and motor, a sub-base carrying said motor and driving shaft and supported by said main base and removable therefrom, and means for adjusting said sub-base longitudinally upon said main base.

8. In a calculating machine, the combination of a calculating mechanism having a main shaft, a base supporting said mechanism, a keyboard supported by said mechanism and spaced away from said base, a motor located between said base and keyboard, a driving shaft actuated by said motor, means on said driving shaft actuating the main shaft of said mechanism, a cover supported by said base and enclosing said mechanism, keyboard and motor, a sub-base carrying said motor and driving shaft and supported by said main base and removable therefrom, said main base having upward projections rising above its bottom and to which said sub-base is secured.

9. In a calculating machine, the combination of a calculating mechanism having a main shaft, a base supporting said mechanism, a keyboard supported by said mechanism and spaced away from said base, a motor located between said base and keyboard, a rearwardly extending driving shaft actuated by said motor, a cam carried by the rear portion of said shaft and having an irregular cam surface, the axes of said shaft and cam being at right angles to one another.

10. In a calculating machine, the combination of a calculating mechanism having a main shaft, a base supporting said mechanism, a keyboard supported by said mechanism and spaced away from said base, a motor located between said base and keyboard, a rearwardly extending driving shaft actuated by said motor, a cam carried by the rear portion of said shaft and having an irregular cam surface, means connected to said shaft and engaging said cam surface, the axes of said shaft and cam being at right angles to one another, and a sub-base carrying said motor and driving shaft and supported by said main base.

11. In a calculating machine, the combination of a calculating mechanism having a main shaft, a crank arm connected to said main shaft, a cam having a groove with which said crank arm engages so as to be actuated by said cam, a motor adapted to rotate said cam, said groove being so shaped that the load on said motor and driving shaft is substantially constant during the actuating movement of said cam.

12. In a calculating machine, the combination of a calculating mechanism having a main shaft, a crank arm connected to said main shaft, a cam having a groove with which said crank arm engages so as to be actuated by said cam, a motor adapted to rotate said cam, said groove being so shaped that the load on said motor and driving shaft is substantially constant during the actuating movement of said cam, means for stopping said cam in a predetermined condition at the end of a revolution said cam having a dwell engaging said crank arm when said cam is so stopped.

13. In a calculating machine, the combination of a calculating mechanism having a main shaft, a crank arm connected to said main shaft, a cam having a groove with which said crank arm engages so as to be actuated by said cam, a motor adapted to rotate said cam, said groove being so shaped that the load on said motor and driving shaft is substantially uniform during the actuating movement of said cam, means for stopping said cam in a predetermined condition at the end of a revolution said cam having a vertical dwell engaging said crank arm when said cam is so stopped, and for a substantial period between any two successive actuating movements of said cam.

14. In a calculating machine, the combination of a calculating mechanism, a motor therefor, a keyboard, an elongated touch bar, supporting means for said touch bar, and connections controlled by said supporting means for causing said motor to drive said mechanism, said touch bar being pivoted to said supporting means so as to be tiltable from a normally horizontal plane to a vertical plane, and a cover for said mechanism and keyboard removable by an upward movement, said touch bar normally interfering with said touch movement but when tilted being out of the path thereof.

15. In a calculating machine, the combination of a calculating mechanism having a frame, a base to which said frame is pivoted so as to be tiltable thereon, an arm extending downwardly from the main shaft of said mechanism, a laterally projecting pin thereon, a barrel cam having a forwardly extending axis and a cam groove engaged by said pin, the forward end of said cam having a rest which is vertical and engaged by said pin when the cam is stopped between cycles, a motor for driving said cam, manual means for connecting said motor to said cam, and automatic means for disconnecting it at the end of a cycle, said rest being substantially in line with the movement of said pin when said mechanism is being tilted.

16. In a calculating machine, the combination of a calculating mechanism having a frame, a base to which said frame is pivoted so as to be tiltable thereon, an arm extending downwardly from the main shaft of said mechanism, a projecting pin thereon, a cam having a cam groove engaged by said pin, said cam having a rest which is engaged by said pin when the cam is stopped between cycles, a motor for driving said cam, manual means for connecting said motor to said cam, and automatic means for disconnecting it at the end of a cycle, said rest permitting the carrying devices of said calculating mechanism to fully operate before the beginning of a new cycle.

17. In a motor driven calculating machine, the combination of a motor, a shaft driven thereby, manually controlled means for connecting said motor and shaft, said means comprising a movable member, a spring for retracting the same to initial position, a manually actuated bar, and a spring connection between said bar and said movable member.

18. In a motor driven calculating machine, the combination of a motor, a shaft driven thereby, manually controlled means for connecting said motor and shaft, said means comprising an oscillating shaft having an arm fixed thereto, a spring for returning said oscillating shaft to initial position, a second arm movably mounted, a spring connection between said arms, and means for manually actuating said movably mounted arm.

19. In a motor driven calculating machine, the combination of a motor, a shaft driven thereby, manually controlled means for connecting said motor and shaft, said means comprising an oscillating shaft having an arm fixed thereto, a spring for returning said oscillating shaft to initial position, a second arm movably mounted, a spring connection between said arms, and means for manually actuating said movably mounted arm, said second arm being mounted on said oscillating shaft.

CHARLES WALES.